United States Patent

Ohyama

(10) Patent No.: US 10,627,237 B2
(45) Date of Patent: Apr. 21, 2020

(54) OFFSET CORRECTION APPARATUS FOR GYRO SENSOR, RECORDING MEDIUM STORING OFFSET CORRECTION PROGRAM, AND PEDESTRIAN DEAD-RECKONING APPARATUS

(71) Applicant: SHARP KABUSHIKI KAISHA, Sakai, Osaka (JP)

(72) Inventor: Shigeo Ohyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/147,739

(22) Filed: Sep. 29, 2018

(65) Prior Publication Data

US 2019/0120627 A1  Apr. 25, 2019

(30) Foreign Application Priority Data

Oct. 20, 2017 (JP) ................................ 2017-203653

(51) Int. Cl.
*G01C 21/16* (2006.01)
*G01C 19/5776* (2012.01)
*G01C 25/00* (2006.01)

(52) U.S. Cl.
CPC ....... *G01C 21/165* (2013.01); *G01C 19/5776* (2013.01)

(58) Field of Classification Search
CPC . G01C 21/165; G01C 19/5776; G01C 25/005
See application file for complete search history.

(56) References Cited

U.S. PATENT DOCUMENTS

| 9,360,497 | B2 * | 6/2016 | Oliver | G01P 21/00 |
| 9,753,054 | B2 * | 9/2017 | Hattori | G01C 19/5776 |
| 9,772,815 | B1 * | 9/2017 | Medina | G06F 3/0346 |
| 10,247,550 | B2 * | 4/2019 | Lin | G01C 21/165 |
| 10,359,446 | B2 * | 7/2019 | Kondoh | G01C 25/005 |
| 10,401,939 | B2 * | 9/2019 | Kabasawa | G06F 3/0346 |
| 2010/0033424 | A1 * | 2/2010 | Kabasawa | G01C 17/28 345/156 |
| 2014/0086438 | A1 * | 3/2014 | Tachibana | H04R 29/001 381/309 |
| 2016/0216116 | A1 * | 7/2016 | Kourogi | G01C 21/12 |
| 2017/0195834 | A1 * | 7/2017 | Na | G01S 5/12 |

FOREIGN PATENT DOCUMENTS

| JP | 2014-098613 A | 5/2014 |
| WO | 2014/185444 A1 | 11/2014 |

* cited by examiner

*Primary Examiner* — Frederick M Brushaber
(74) *Attorney, Agent, or Firm* — ScienBiziP, P.C.

(57) ABSTRACT

An offset correction apparatus for a gyro sensor includes an acceleration sensor, a geomagnetic sensor, a stationary determination unit that determines, by using an output value of the acceleration sensor and an output value of the geomagnetic sensor, whether the gyro sensor is stationary, a difference calculation unit that calculates an offset value of the gyro sensor by using an output value of the gyro sensor, and an offset-value update unit that assumes, as a new offset value, an offset value calculated by the difference calculation unit by using an output value of the gyro sensor determined to be stationary by the stationary determination unit.

6 Claims, 7 Drawing Sheets

OFFSET CORRECTION APPARATUS FOR GYRO SENSOR, RECORDING MEDIUM STORING OFFSET CORRECTION PROGRAM, AND PEDESTRIAN DEAD-RECKONING APPARATUS

BACKGROUND

1. Field

The present disclosure relates to offset correction for a gyro sensor.

2. Description of the Related Art

Gyro sensors are sensors capable of detecting angular velocities and have been used in dead-reckoning applications for ships, airplanes, and rockets. In addition, the recent size reduction and power saving features of gyro sensors have led to wide use of the gyro sensors in consumer appliances such as smartphones, game controllers, robots, digital camera image stabilizers, and car navigation systems. Particularly, in gyro sensors for consumer appliances, referred to as vibration gyro sensors, microelectromechanical systems (MEMS) technology has enabled reduced size and reduced power consumption.

Such vibration gyro sensors include an offset value in their output and there is therefore a desire to perform offset correction (angular velocity offset correction). If the offset value is fixed, no problem arises. However, in the case of a vibration gyro sensor, vibrating a MEMS element generates heat to cause a temperature drift of the offset value. Moreover, the amount of drift is not fixed, and both the polarity thereof and the size thereof differ depending on individual differences and axes. The angular velocities detected in gyro sensors are integrated and the integrals are used, and therefore it is desired to determine an accurate offset value.

Examples of related techniques regarding offset correction for a gyro sensor include Japanese Unexamined Patent Application Publication No. 2014-98613 and International Publication Pamphlet No. WO 2014/185444. Japanese Unexamined Patent Application Publication No. 2014-98613 discloses a technique that stores output values (angular velocity values) from a gyro sensor, identifies corner positions and supposes that a line between the corners is straight, calculates a correction value such that the line is straight in the interval concerned, and recalculates the stored output values. International Publication Pamphlet No. WO 2014/185444 discloses a technique that generates some candidate correction values based on temperature, calculates the azimuth of the movement of a moving body for each of the candidate correction values, and selects an optimum correction value from a histogram of the appearance frequencies.

The related techniques as mentioned above have problems described below.

According to the technique described in Japanese Unexamined Patent Application Publication No. 2014-98613, angular velocity values at least in the interval from one corner to the next are stored and recalculated. Therefore, the technique lacks real-time features. In addition, the underlying assumption in this technique is that a moving body walks straight along a path indoors. If a moving body moves along a gently curving path or moves while swinging from side to side, it is not possible to calculate an accurate offset value.

According to the technique described in International Publication Pamphlet No. WO 2014/185444, as is the case in the above-mentioned technique, it is desired that angular velocity values be stored and therefore the technique lacks real-time features. In addition, a temperature-dependent table is used as candidate correction values and therefore it is desired that a table be created for each device. Furthermore, restrictions such as 0 degrees, ±45 degrees, ±90 degrees, ±135 degrees, and 180 degrees are imposed on the direction of movement, and the underlying assumption in this technique is that a moving body walks straight with respect to a path in a limited space. Accordingly, the selected offset values may be inaccurate in some cases.

It is desirable to implement an offset correction apparatus for a gyro sensor capable of correcting an offset value of a gyro sensor in real time instead of storing output values of the gyro sensor and correcting the offset value in reverse chronological order.

SUMMARY

An offset correction apparatus for a gyro sensor according to an aspect of the disclosure includes an acceleration sensor, a geomagnetic sensor, a stationary determination unit configured to determine, by using an output value of the acceleration sensor and an output value of the geomagnetic sensor, whether the gyro sensor is stationary, an offset-value calculation unit configured to calculate an offset value of the gyro sensor by using an output value of the gyro sensor, and an offset-value update unit configured to assume, as a new offset value of the gyro sensor, an offset value calculated by the offset-value calculation unit by using an output value of the gyro sensor determined to be stationary by the stationary determination unit.

DESCRIPTION OF THE EMBODIMENTS

Embodiment 1

Hereinafter, an embodiment of the present disclosure will be described in detail.
Configuration of Offset Correction Apparatus 1

Figure 1:
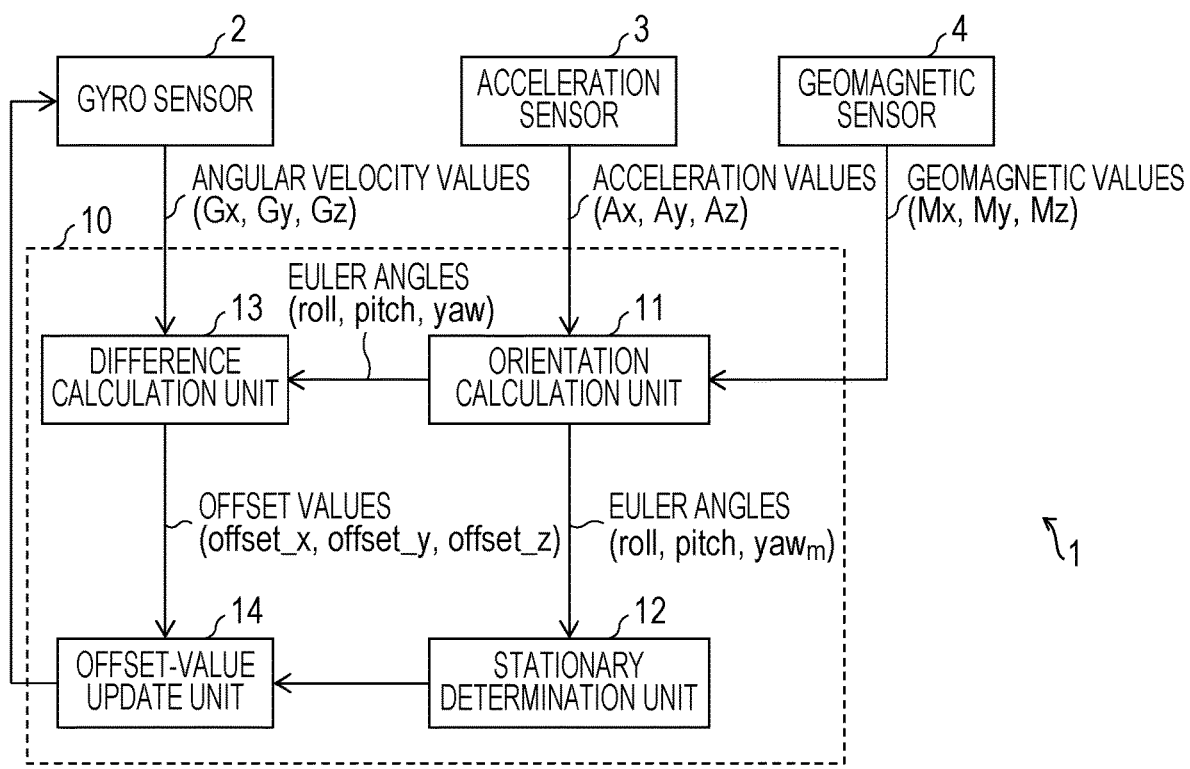
FIG. 1 is a block diagram of an angular velocity offset correction apparatus according to an embodiment.

FIG. 1 is a block diagram of an offset correction apparatus 1 according to an embodiment of the present disclosure. As illustrated in FIG. 1, the offset correction apparatus 1 includes, as hardware, a gyro sensor 2, an acceleration sensor 3, a geomagnetic sensor 4, and a microcontroller 10.

The gyro sensor 2, which is a vibration gyro sensor, measures an angular velocity and outputs angular velocity values (Gx, Gy, Gz). The acceleration sensor 3 measures an acceleration and outputs acceleration values (Ax, Ay, Az). The geomagnetic sensor 4 measures geomagnetism and outputs geomagnetic values (Mx, My, Mz). The gyro sensor 2, the acceleration sensor 3, and the geomagnetic sensor 4 are mounted on an apparatus, such as a pedestrian dead-reckoning apparatus according to Embodiment 3, and move integrally with the apparatus.

Angular velocity values output from the gyro sensor 2, acceleration values output from the acceleration sensor 3, and geomagnetic values output from the geomagnetic sensor 4 are input to the microcontroller 10. The microcontroller 10 uses these input values to determine offset values of the gyro sensor 2, and updates the existing offset values (angular-velocity offset values) of the gyro sensor 2.

Processing in the microcontroller 10 is implemented by software, and an orientation calculation unit 11, a stationary determination unit 12, a difference calculation unit (offset-value calculation unit) 13, and an offset-value update unit 14 are constructed inside the microcontroller 10.

The orientation calculation unit 11 uses acceleration values output from the acceleration sensor 3 and geomagnetic values output from the geomagnetic sensor 4 to calculate Euler angles of the gyro sensor 2.

The difference calculation unit 13 is an offset-value calculation unit that uses output values of a gyro sensor to calculate offset values of the gyro sensor. The difference calculation unit 13 calculates, as offset values, values obtained by dividing, by a fixed time period, a difference between a variation in the Euler angles of the gyro sensor 2 over the fixed time period and values obtained by integrating the output values (acceleration values) of the gyro sensor 2 for the fixed time period.

The stationary determination unit 12 uses both the acceleration values output from the acceleration sensor 3 and the geomagnetic values output from the geomagnetic sensor 4 to determine whether the gyro sensor 2 is stationary. Using the Euler angles of the gyro sensor 2 determined by using the acceleration values and the geomagnetic values, the stationary determination unit 12 determines from a variation in the Euler angles over the fixed time period whether the gyro sensor 2 is stationary.

The offset-value update unit 14 is configured to update offset values of the gyro sensor 2. The offset-value update unit 14 assumes, as new offset values of the gyro sensor 2, offset values calculated by the difference calculation unit 13 by using output values of the gyro sensor 2 that is determined to be stationary by the stationary determination unit 12.

Calculation of Euler Angles by Orientation Calculation Unit 11

Figure 2:
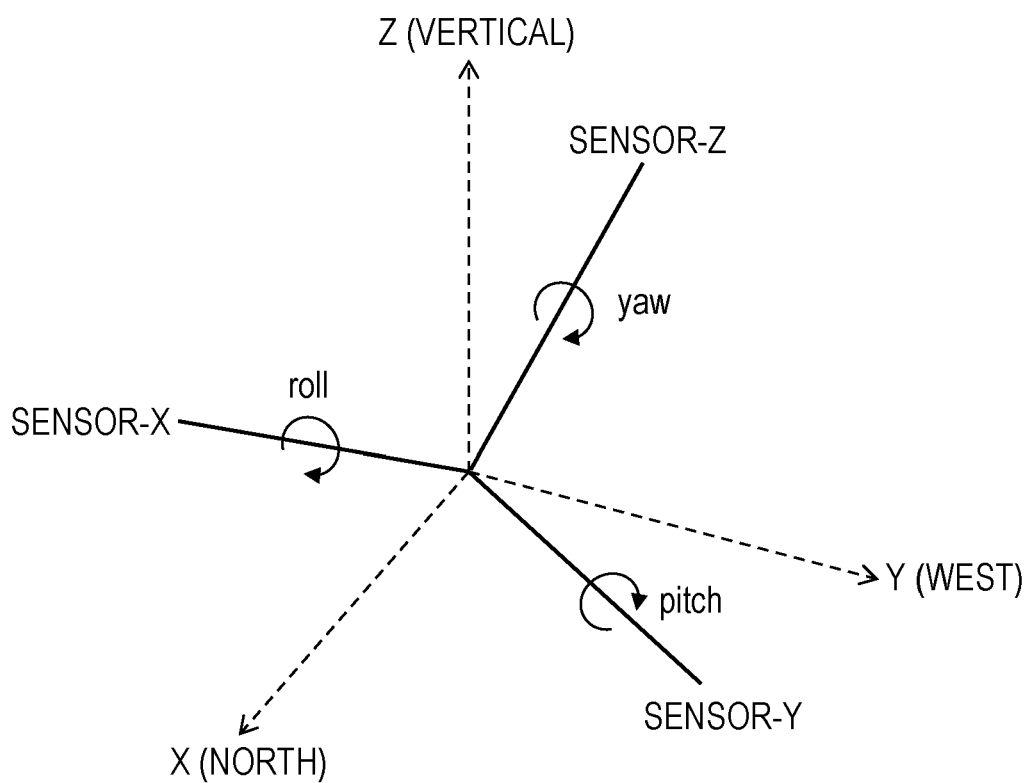
FIG. 2 is a diagram illustrating a relationship between sensor axes and absolute coordinate axes.

FIG. 2 is a diagram illustrating a relationship between sensor axes and absolute coordinate axes. With reference to FIG. 2, an Euler angle calculation method by the orientation calculation unit 11 will be described. As illustrated in FIG. 2, Euler angles are represented as a set of three angles, assuming that rotation around a sensor X-axis (SENSOR-X) is denoted as a roll angle, rotation around a sensor Y-axis (SENSOR-Y) as a pitch angle, and rotation around a sensor Z-axis (SENSOR-Z) as a yaw angle. By making use of the fact that an acceleration value points vertically down, first Euler angles (roll, pitch, yaw) can be calculated by using acceleration values (Ax, Ay, Az), as in the following expressions.

$$\text{roll} = \tan^{-1}(Ay/Az)$$

$$\text{pitch} = \tan^{-1}(Ax/\sqrt{Ay^2 + Az^2})$$

$$\text{yaw} = \tan^{-1}(Az/\sqrt{Ax^2 + Ay^2}) \quad \text{[Math. 1]}$$

For a yaw angle, the orientation calculation unit 11 also performs calculation using geomagnetic values. By making use of the fact that a geomagnetic value points to the magnetic north, a yaw angle can be determined from geomagnetic values. However, the magnetic north direction has a vertical downward component (inclination), and therefore a yaw angle is calculated by mapping to the XY plane. Expressions for determining a yaw angle (yaw) by using geomagnetic values (Mx, My, Mz) are given below.

$$cMx = Mx \times \cos(\text{pitch}) + My \times \sin(\text{roll}) \times \sin(\text{pitch}) + Mz \times \cos(\text{roll}) \times \sin(\text{pitch})$$

$$cMy = My \times \cos(\text{roll}) - Mz \times \sin(\text{roll})$$

$$\text{yaw}_m = \tan^{-1}(-cMy/cMx) \quad \text{[Math. 2]}$$

A yaw angle determined by using geomagnetic values is described as a yaw angle ($\text{yaw}_m$) in order to distinguish it from a yaw angle (yaw) determined by using acceleration values. In addition, hereinafter, the Euler angles calculated by using acceleration values are referred to as first Euler angles, and the Euler angles (roll, pitch, $\text{yaw}_m$) including a roll angle (roll) and a pitch angle (pitch) calculated by using acceleration values and a yaw angle ($\text{yaw}_m$) determined by using geomagnetic values are referred to as second Euler angles.

Difference Calculation by Difference Calculation Unit 13

Figure 3:
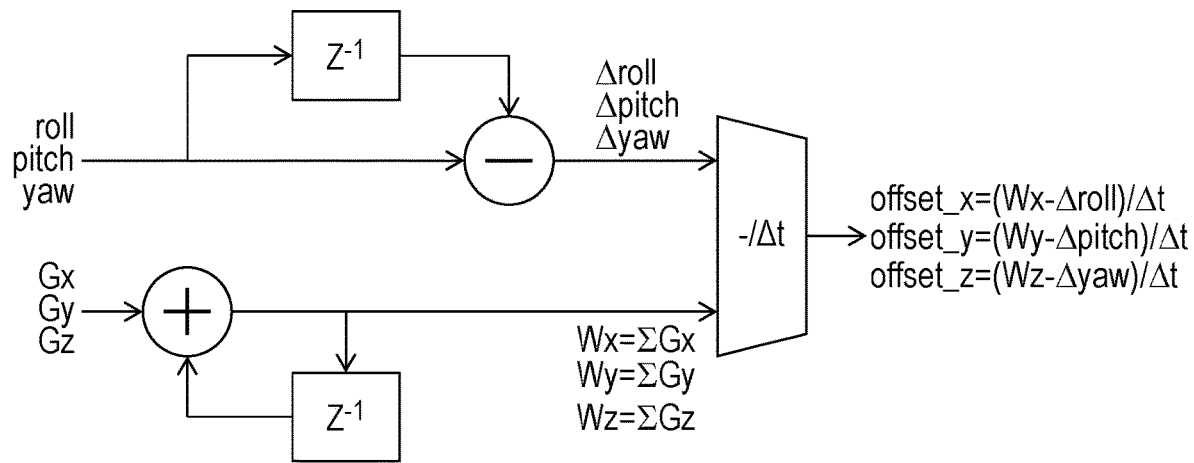
FIG. 3 is a diagram illustrating a method for calculating differences, according to an embodiment.

FIG. 3 is a diagram illustrating a method for performing difference calculation by the difference calculation unit 13. As illustrated in FIG. 3, the difference calculation unit 13 integrates angular velocity values (Gx, Gy, Gz) output from the gyro sensor 2 from a time t to a time t+Δt to determine an Euler angle variation amount (Wx, Wy, Wz). The difference calculation unit 13 also uses the first Euler angles (roll, pitch, yaw) calculated by the orientation calculation unit 11 to determine a difference (Δroll, Δpitch, Δyaw) between the first Euler angles at the time t and the first Euler angles at the time t+Δt.

The determined Euler angle variation amount (Wx, Wy, Wz) matches the determined difference in Euler angles (Δroll, Δpitch, Δyaw) if there is no offset (angular velocity offset) in the gyro sensor 2. However, there is an offset and therefore a difference occurs. Here, Δt is a short time and therefore, supposing that the offset values during Δt are fixed, the values obtained by dividing, by Δt, a difference between the variation and the difference mentioned above can be determined to be offset values. The above Δt is, for example, 100 ms.

That is, the difference calculation unit 13 determines a difference between the Euler angle variation amount (Wx, Wy, Wz) and the difference in the first Euler angles (Δroll, Δpitch, Δyaw), divides the determined difference (Wx−Δroll, Wy−Δpitch, Wx−Δyaw) by Δt, and assumes the resultant values ((Wx−Δroll)/Δt, (Wy−Δpitch)/Δt, (Wz−Δyaw)/Δt)) as offset values (offset_x, offset_y, offset_z).

Stationary Determination Calculation by Stationary Determination Unit

Figure 4:
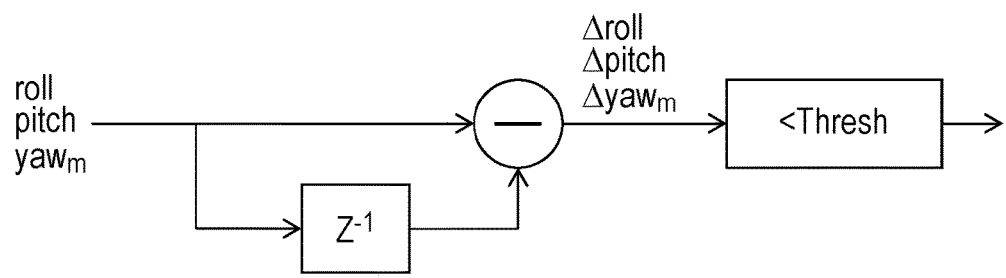
FIG. 4 is a diagram illustrating a method for stationary determination calculation, according to an embodiment.

FIG. 4 is a diagram illustrating a method for performing stationary determination calculation by the stationary determination unit 12. As illustrated in FIG. 4, the stationary determination unit 12 uses the second Euler angles (roll, pitch, $yaw_m$) calculated by the orientation calculation unit 11 to determine a difference ($\Delta$roll, $\Delta$pitch, $\Delta yaw_m$) between the second Euler angles at the time t and the second Euler angles at the time t+$\Delta$t. If the determined difference ($\Delta$roll, $\Delta$pitch, $\Delta yaw_m$) is sufficiently small, the stationary determination unit 12 determines that the gyro sensor 2 is stationary. When the determined difference is, for example, 1 degree, the determined difference is determined to be sufficiently small.

Update Method by Offset-Value Update Unit

Figure 5:
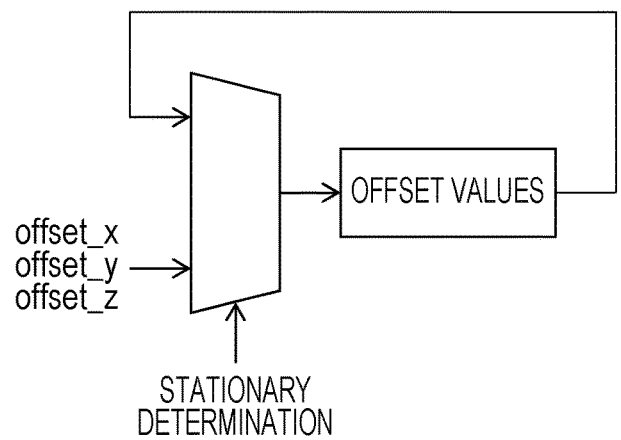
FIG. 5 is a diagram illustrating a method for updating an offset correction value, according to an embodiment.

FIG. 5 is a diagram illustrating a method for updating an offset value by the offset-value update unit 14. As illustrated in FIG. 5, upon a determination by the stationary determination unit 12 that the gyro sensor 2 is stationary, the offset-value update unit 14 updates the offset values of the gyro sensor 2 with the offset values (offset_x, offset_y, offset_z) calculated by the orientation calculation unit 11. When the gyro sensor 2 is determined to be not stationary, the update of the offset values is not performed.

Processing Procedure of Offset-Value Correction

Figure 6:
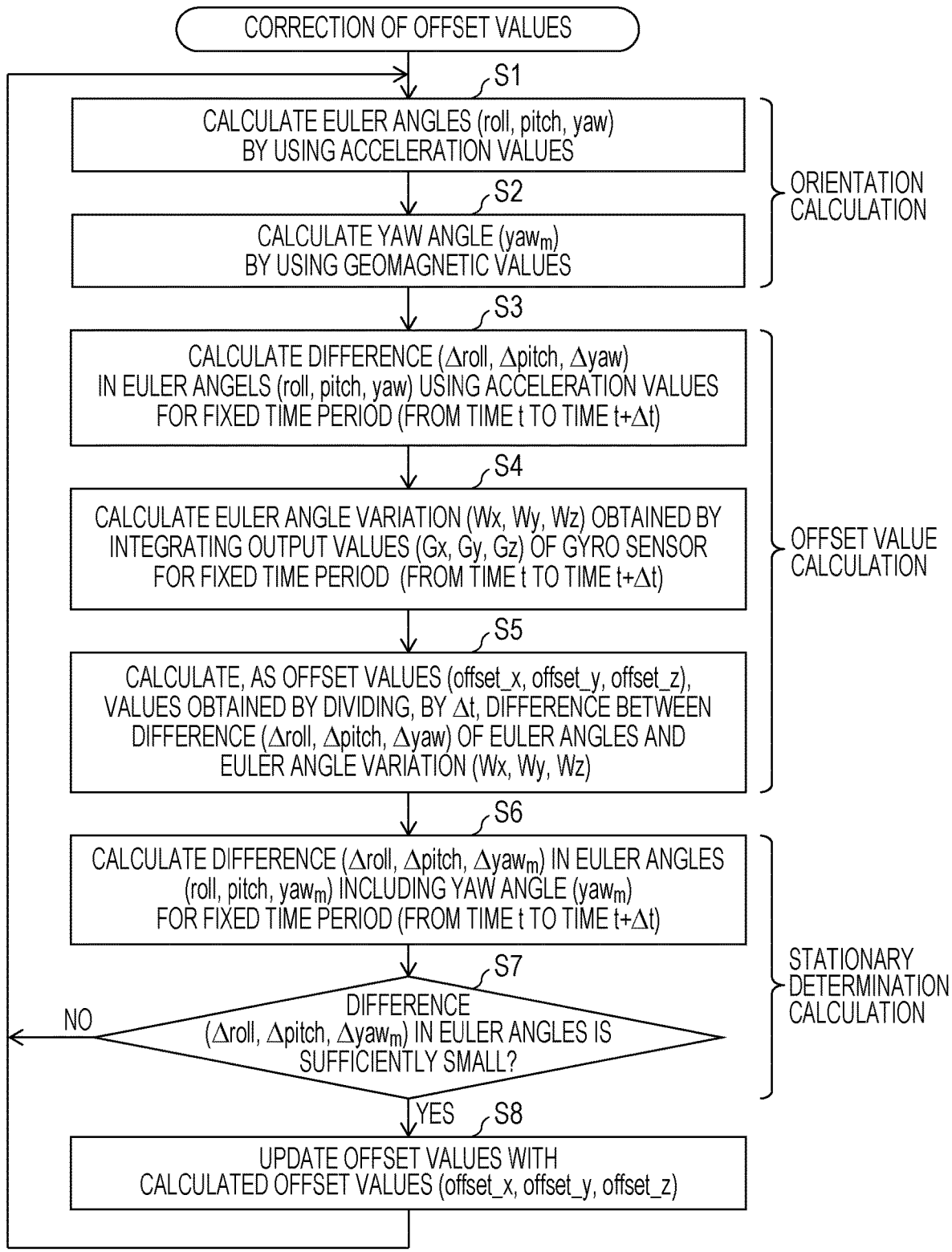
FIG. 6 is a flowchart of offset-value correction, according to an embodiment.

FIG. 6 is a flowchart of offset-value correction in the offset correction apparatus 1. As illustrated in FIG. 6, the microcontroller 10 calculates the first Euler angles using acceleration values output from the acceleration sensor 3 and the second Euler angles including a yaw angle ($yaw_m$) determined by using geomagnetic values output from the geomagnetic sensor 4 (S1 and S2). S1 and S2 may be performed in reverse order or simultaneously.

Next, the microcontroller 10 determines the difference ($\Delta$roll, $\Delta$pitch, $\Delta$yaw) between the first Euler angles at the time t and the first Euler angles at the time t+$\Delta$t and determines the Euler angle variation amount (Wx, Wy, Wz) obtained by integrating angular velocity values (Gx, Gy, Gz) output from the gyro sensor 2 from the time t to the time t+$\Delta$t (S3 and S4). S3 and S4 may be performed in reverse order or simultaneously. Next, the microcontroller 10 determines a difference between the Euler angle variation amount (Wx, Wy, Wz) and the difference in the first Euler angles ($\Delta$roll, $\Delta$pitch, $\Delta$yaw), which are determined in S3 and S4, and assumes, as offset values (offset_x, offset_y, offset_z), values obtained by dividing the determined difference by $\Delta$t (S5).

Next, the microcontroller 10 determines a difference ($\Delta$roll, $\Delta$pitch, $\Delta yaw_m$) between the second Euler angles at the time t and the second Euler angles at the time t+$\Delta$t (S6) and determines whether the determined difference in the second Euler angles ($\Delta$roll, $\Delta$pitch, $\Delta yaw_m$) is sufficiently small (S7). If, in S7, the difference is sufficiently small, the gyro sensor 2 is determined to be stationary, the process proceeds to S8, where the offset values of the gyro sensor 2 are updated with the offset values (offset_x, offset_y, offset_z) calculated in S5, and then the process returns to S1. However, if, in S7, the difference is not sufficiently small, the gyro sensor 2 is determined to be not stationary, in which case the process does not proceed to S8 but returns to S1.

Note that S6 may be performed prior to or simultaneously with S3 to S5 described above. In addition, S6 and S7 may be performed prior to S3 to S5, in which case, if it is determined in S7 that the gyro sensor 2 is stationary, then S3 to S5 are performed and the process proceeds to S8.

Advantages of Embodiment

As described above, in the offset correction apparatus 1 according to the present embodiment, it is determined by using acceleration values output from the acceleration sensor 3 and geomagnetic values output from the geomagnetic sensor 4 whether the gyro sensor 2 is stationary, and if the gyro sensor 2 is stationary, offset values of the gyro sensor 2 are determined by using angular velocity values output from the gyro sensor 2 that is stationary and the existing offset values are corrected.

Accordingly, it is possible to correct the offset values of the gyro sensor 2 in real time without storing output values of the gyro sensor 2.

With the foregoing configuration, the stationary determination unit 12 uses the second Euler angles including a yaw angle ($yaw_m$) calculated by using geomagnetic values to determine whether the gyro sensor 2 is stationary. With a yaw angle (yaw) determined from acceleration values, a rotation operation with respect to the vertical axis is unable to be detected. However, a yaw angle ($yaw_m$) determined from geomagnetic values is used for stationary determination. This enables the stationary determination to be performed accurately.

In addition, with the foregoing configuration, in calculating offset values (angular-velocity offset values) of the gyro sensor 2 by using output values of the gyro sensor 2, the difference calculation unit 13 calculates, as offset values of the gyro sensor 2, values obtained by dividing, by the fixed time period ($\Delta$t), a difference between a variation in the Euler angles of the gyro sensor 2 over the fixed time period ($\Delta$t) and values obtained by integrating output values of the gyro sensor 2 for the fixed time period ($\Delta$t).

The output values from the gyro sensor 2 that is stationary are to be zero if there are no offset values. However, in reality, noise is included, and therefore the output values from the gyro sensor 2 that is stationary are not equal to offset values. As with the foregoing configuration, the noise components may be removed by taking a difference between a variation in the Euler angles over the fixed time period ($\Delta$t) and values obtained by integrating output values of the gyro sensor 2 for the fixed time period ($\Delta$t).

In addition, using the coordinate system of sensor axes, instead of using the Euler angles of the apparatus with respect to absolute coordinates (up and down in the gravity direction and north, south, east, and west), enables the offset values of a gyro sensor to be determined by dividing the above difference by the predetermined time period ($\Delta$t).

Furthermore, with the foregoing configuration, the difference calculation unit 13 uses the first Euler angles calculated from angular velocity values and therefore offset values may be accurately calculated. That is, the signal-to-noise ratio (S/N) of an output value (geomagnetic value) of a geomagnetic sensor is poor because the geomagnetism is weak, while the S/N of an output value (acceleration value) of an acceleration sensor is high because the gravitational acceleration is large. Accordingly, it is desirable that offset values be calculated with the Euler angles using only acceleration values without using geomagnetic values.

Note that, in FIG. 1, the configuration using the gyro sensor 2 capable of setting offset values is illustrated. However, for a gyro sensor that does not have such a function, the configuration may be such that feedback of offset values is performed by the microcontroller 10 using software.

Embodiment 2

Another embodiment of the present disclosure will be described below. Note that, for explanatory convenience, members having the same functions as the members described in the above embodiment are denoted by the same reference numerals and description thereof is not repeated.

Figure 7:
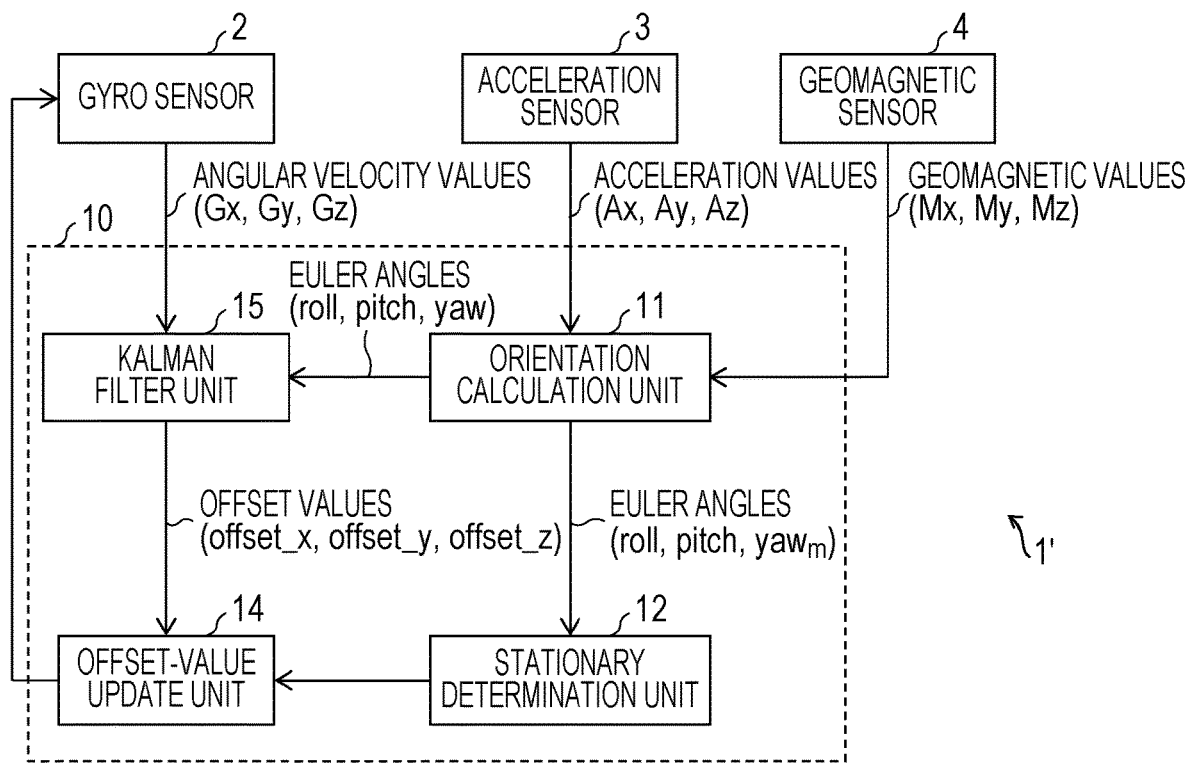
FIG. 7 is a block diagram of another angular velocity offset-value correction apparatus according to an embodiment.

FIG. 7 is a block diagram of an offset correction apparatus 1' according to the present embodiment. As illustrated in FIG. 7, in the offset correction apparatus 1', a microcontroller 10' includes, as an offset-value calculation unit, a Kalman filter unit 15 instead of the difference calculation unit 13. In this regard, the offset correction apparatus 1' differs from the offset correction apparatus 1 according to Embodiment 1.

Calculation Method by Kalman Filter Unit 15

Figure 8:
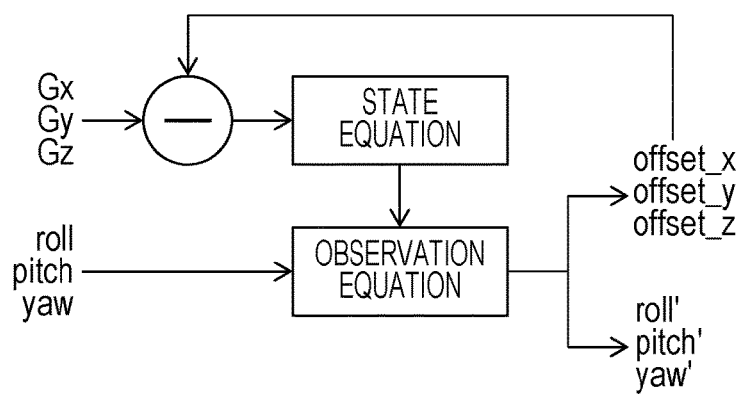
FIG. 8 is diagram illustrating a method for calculating a Kalman filter, according to another embodiment.

FIG. 8 is a diagram illustrating a calculation method by the Kalman filter unit 15. As illustrated in FIG. 8, the Kalman filter unit 15 generates a state equation from output values (Gx, Gy, Gz) of the gyro sensor 2, then generates an observation equation by using the generated state equation and the first Euler angles (roll, pitch, yaw), and calculates estimated Euler angles (roll', pitch', yaw') and offset values (offset_x, offset_y, offset_z).

Calculation of rotation around the X-axis (roll) by the Kalman filter unit 15 will be described below. Note that rotation around the Y-axis (pitch) and rotation around the Z-axis (yaw) are calculated likewise.

A state x, at the time t is defined as below.

$$x_t = \begin{pmatrix} \text{roll} \\ \text{offset\_x} \end{pmatrix}$$ [Math. 3]

A state equation at the time $t+\Delta t$ is expressed below. In the equation given below, Q is state noise.

$$x_{t+\Delta t|t} = F_{t+\Delta t} x_{t|t} + \Delta t \times Q$$ [Math. 4]

$$F_{t+\Delta t} = \begin{pmatrix} 1 + \dfrac{\Delta t \times Gx_{t+\Delta t}}{\text{roll}_t} & -\Delta t \\ 0 & 1 \end{pmatrix}$$

In addition, an observation equation is as follows. In the equation given below, R is observation noise.

$$z_{t+\Delta t} = x_{t+\Delta t} + R$$ [Math. 5]

Calculation by the Kalman filter unit 15 is indicated below. Note that I in the expressions given below is an identity matrix.

Prediction Steps:

predicted estimated value at time $t+\Delta t$ $x_{t+\Delta t|t} = F_{t+\Delta t} x_{t|t}$ predicted error matrix at time $t+\Delta t$ $P_{t+\Delta t|t} = F_{t+\Delta t} P_{t|t} F_{t+\Delta t}^T + \Delta t \times Q$ Update Steps:

observation residual $e_{t+\Delta t} = z_{t+\Delta t} - x_{t+\Delta t|t}$ covariance of observation residual $S_{t+\Delta t} = R + P_{t+\Delta t|t}$ optimal Kalman gain $K_{t+\Delta t} = P_{t+\Delta t|t} S_{t+\Delta t}^{-1}$ estimated value in updated state $x_{t+\Delta t|t+\Delta t} = x_{t+\Delta t|t} + K_{t+\Delta t} e_{t+\Delta t}$ covariance of updated error $P_{t+\Delta t|t+\Delta t} = (I - K_{t+\Delta t}) P_{t+\Delta t|t}$ [Math. 6]

Instead of being not fed back from the offset-value update unit 14 to the gyro sensor 2 in FIG. 7, the estimated Euler angles (roll', pitch', yaw') can be used as the Euler angles in which an offset is taken into account.

Figure 9:
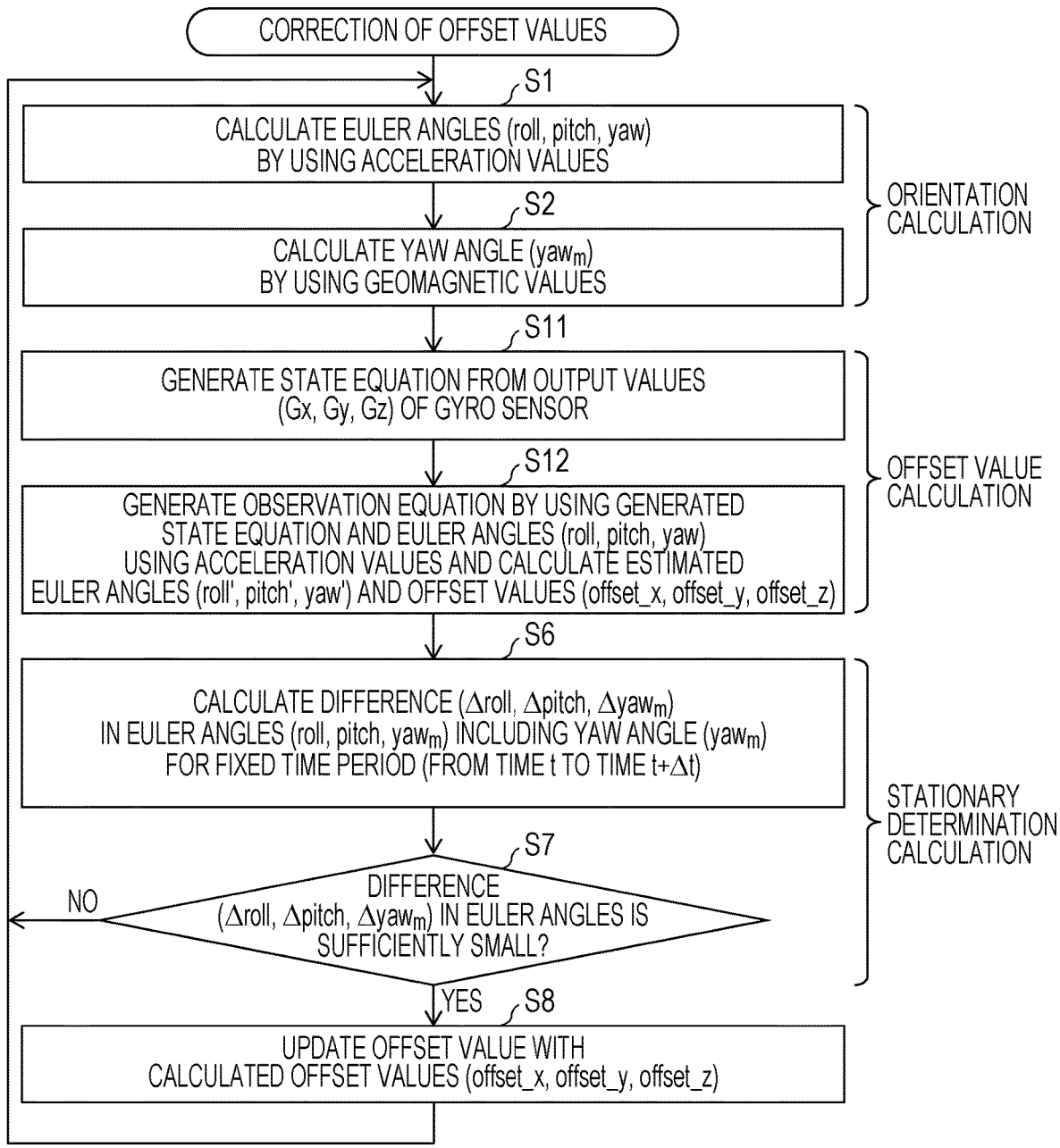
FIG. 9 is a flowchart of offset-value correction, according to another embodiment.

FIG. 9 is a flowchart of offset-value correction by the offset correction apparatus 1'. Instead of S3 to S5 in the flowchart illustrated in FIG. 6, S11 and S12 are performed. In S11, a state equation is generated from the output values (Gx, Gy, Gz) of the gyro sensor 2. In S12, an observation equation is generated by using the generated state equation and the first Euler angles (roll, pitch, yaw), and the estimated Euler angles (roll', pitch', yaw') and offset values (offset_x, offset_y, offset_z) are calculated.

Embodiment 3

Another embodiment of the present disclosure will be described below. For explanatory convenience, members having the same functions as the members described in the above embodiments are denoted by the same reference numerals and description thereof is not repeated.

Configuration of Pedestrian Dead-Reckoning Apparatus 7

Figure 10:
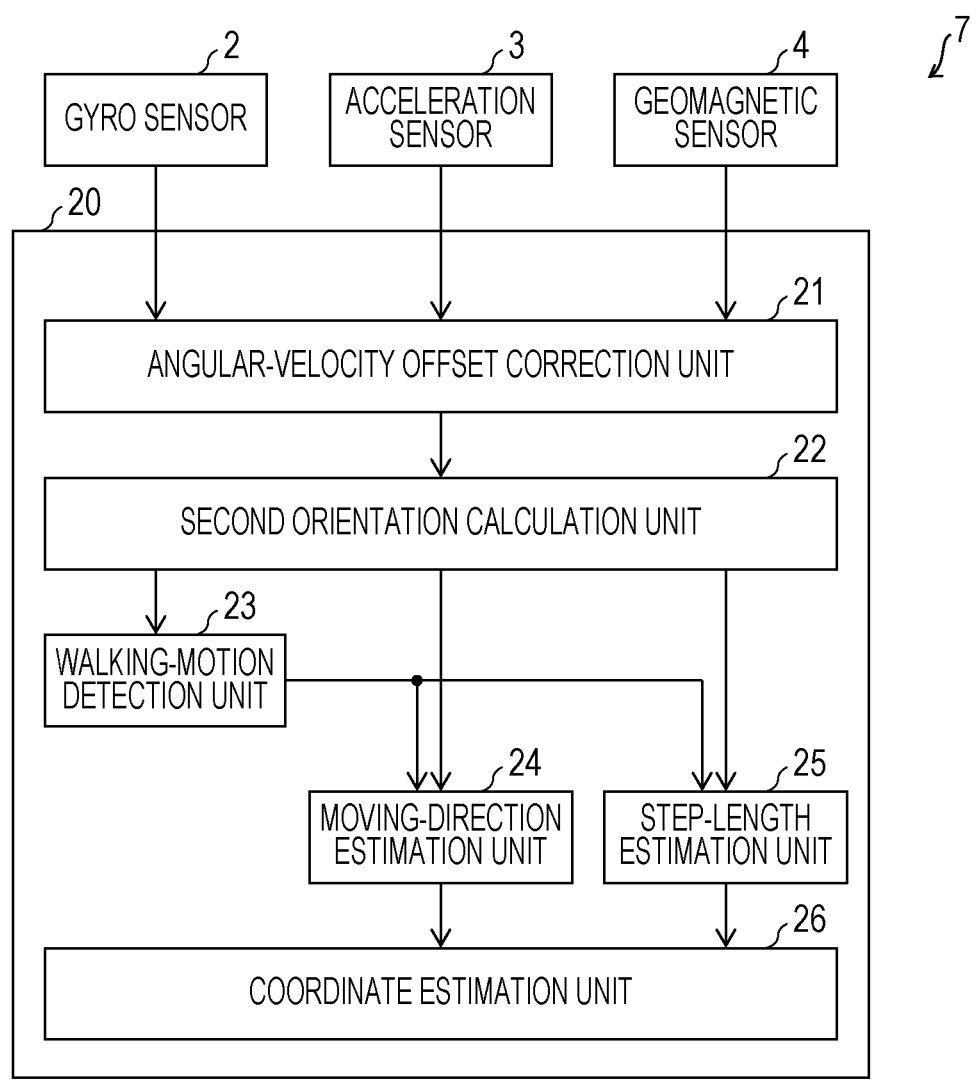
FIG. 10 is a block diagram of a pedestrian dead-reckoning apparatus according to an embodiment.

FIG. 10 illustrates a configuration of a pedestrian dead-reckoning apparatus 7 according to the present embodiment. The pedestrian dead-reckoning apparatus 7 includes, as hardware, the gyro sensor 2, the acceleration sensor 3, the geomagnetic sensor 4, and a microcontroller 20. The processing inside the microcontroller 20 is implemented by software. Inside the microcontroller 20, an angular-velocity offset correction unit 21, a second orientation calculation unit 22, a walking-motion detection unit 23, a moving-direction estimation unit 24, a step-length estimation unit 25, and a coordinate estimation unit 26 are constructed.

The functions of the microcontroller 10 or 10' in the offset correction apparatus 1 or 1' according to Embodiment 1 or 2 described above are included in the angular-velocity offset correction unit 21. The second orientation calculation unit 22 determines the orientation (Euler angles and quaternion) of the pedestrian dead-reckoning apparatus 7 based on the angular velocity values of the gyro sensor 2 whose offset values are corrected in real time by the angular-velocity offset correction unit 21.

The walking-motion detection unit 23 detects a walking motion from the orientation determined by the second orientation calculation unit 22 and angular velocity values of the gyro sensor 2. The moving-direction estimation unit 24 estimates the direction of walking from the orientation determined by the second orientation calculation unit 22 and angular velocity values output from the gyro sensor 2.

The step-length estimation unit 25 estimates the length of one step from the orientation determined by the second orientation calculation unit 22 and acceleration values output from the acceleration sensor 3.

The coordinate estimation unit 26 estimates coordinates from the walking direction estimated by the moving-direction estimation unit 24 and the step length estimated by the step-length estimation unit 25 and calculates the track of walking.

The pedestrian dead-reckoning apparatus 7 is mounted on a smartphone, a tablet, a robot, or an action logger.

Example of Implementation by Software

The difference calculation unit 13, the orientation calculation unit 11, the stationary determination unit 12, the offset-value update unit 14, and the Kalman filter unit 15 in the offset correction apparatuses 1 and 1' and the angular-velocity offset correction unit 21, the second orientation calculation unit 22, the walking-motion detection unit 23, the moving-direction estimation unit 24, the step-length estimation unit 25, and the coordinate estimation unit 26 in the pedestrian dead-reckoning apparatus 7 may be implemented by a logic circuit (hardware) formed in an integrated circuit (IC) chip or the like or may be implemented by software.

In the case of being implemented by software, the offset correction apparatus 1 or 1' or the pedestrian dead-reckoning apparatus 7 includes a computer that executes instructions of programs, which are software that implements functions. The computer includes, for example, at least one processor (control device) and includes at least one computer-readable recording medium having stored thereon the programs mentioned above. Furthermore, in the computer, the processor reads the programs from the recording medium and executes the programs, thereby achieving an aspect of the present disclosure. As the processor mentioned above, for example, a central processing unit (CPU) may be used. As the recording medium, a "non-transitory tangible medium", for example, as well as a read-only memory (ROM) or the like, a tape, a disk, a card, a semiconductor memory, a programmable logic circuit, or the like may be used. In addition, a random access memory (RAM) in which the programs are loaded may further be included. In addition, the programs may be supplied via a certain transmission medium (a communication network, broadcast waves, or the like) capable of transmitting the programs to the computer. Note that an aspect of the present disclosure may also be achieved in the form of data signals embedded in carrier waves, in which the programs are implemented by electronic transmission.

CONCLUSION

An offset correction apparatus for a gyro sensor according to Aspect 1 of the present disclosure is the offset correction apparatus 1 or 1' for the gyro sensor 2. The offset correction apparatus 1 or 1' includes the acceleration sensor 3, the geomagnetic sensor 4, the stationary determination unit 12 that determines, by using output values of the acceleration sensor 3 and output values of the geomagnetic sensor 4, whether the gyro sensor 2 is stationary, the offset-value calculation unit (the difference calculation unit 13 or the Kalman filter unit 15) that calculates offset values of the gyro sensor 2 by using output values of the gyro sensor 2, and the offset-value update unit 14 that assumes, as new offset values of the gyro sensor 2, offset values calculated by the offset-value calculation unit by using output values of the gyro sensor 2 that is determined to be stationary by the stationary determination unit 12.

With the above configuration, the stationary determination unit 12 uses output values (acceleration values) of the acceleration sensor 3 and output values (geomagnetic values) of the geomagnetic sensor 4 to determine whether the gyro sensor 2 is stationary. A change in the gravity direction can be detected from the acceleration values, and a change in the horizontal direction can be detected from the geomagnetic values. When there is no change both in the gravity direction and in the horizontal direction, the gyro sensor 2 can be determined to be stationary.

The offset-value calculation unit uses output values of the gyro sensor 2 to calculate offset values (angular-velocity offset values) of the gyro sensor 2. The offset-value update unit 14 updates the existing offset values, assuming that offset values calculated by using angular velocity values output from the gyro sensor 2 that is determined to be stationary by the stationary determination unit 12 are new offset values.

The output values from the gyro sensor 2 that is stationary are to be zero if there are no offset values, and offset values can be calculated by using output values from the gyro sensor 2 that is stationary.

Accordingly, it is possible to correct offset values of the gyro sensor 2 in real time without storing output values of the gyro sensor 2.

An offset correction apparatus for a gyro sensor according to Aspect 2 of the present disclosure has a configuration in which, in Aspect 1 mentioned above, the offset-value calculation unit calculates, as the offset values, values obtained by dividing, by a fixed time period, a difference between a variation in the Euler angles of the gyro sensor 2 over the fixed time period and values obtained by integrating output values of the gyro sensor 2 for the fixed time period.

The output values from the gyro sensor 2 that is stationary are to be zero if there are no offset values. However, in reality, noise is included and therefore the output values from the gyro sensor 2 that is stationary are not equal to offset values. As with the configuration mentioned above, the noise components may be removed by taking a difference between a variation in the Euler angles over a fixed time period ($\Delta t$) and values obtained by integrating output values of the gyro sensor 2 for the fixed time period ($\Delta t$).

In addition, using the coordinate system of sensor axes, instead of using the Euler angles of the apparatus with respect to absolute coordinates (up and down in the gravity direction and north, south, east, and west), enables the offset values of the gyro sensor 2 to be determined by dividing the difference mentioned above by the fixed time period ($\Delta t$).

An offset correction apparatus for a gyro sensor according to Aspect 3 of the present disclosure has a configuration in which, in Aspect 1 mentioned above, the offset-value calculation unit includes the Kalman filter unit 15, generates a state equation from angular velocity values output from the gyro sensor 2, generates an observation equation by using the state equation and the Euler angles of the gyro sensor 2, and calculates the offset values by using the observation equation.

As in Aspect 2 mentioned above, offset values may be calculated by removing the noise components of output values of the gyro sensor 2.

An offset correction apparatus for a gyro sensor according to Aspect 4 of the present disclosure has a configuration in which, in Aspect 2 or 3 mentioned above, the offset-value calculation unit calculates the Euler angles of the gyro sensor 2 by using output values of the acceleration sensor 3.

The S/N of an output value (geomagnetic value) of the geomagnetic sensor 4 is poor because the geomagnetism is weak. In contrast, the S/N of an output value (acceleration value) of the acceleration sensor 3 is high because the gravity acceleration is large. With the above configuration, the output values of the geomagnetic sensor 4 are not used but only the output values of the acceleration sensor 3 are used for calculation of the Euler angles, and therefore the offset values may be calculated accurately.

A pedestrian dead-reckoning apparatus according to Aspect 5 of the present disclosure has a configuration in which the offset correction apparatus for a gyro sensor according to any one of Aspects 1 to 4 mentioned above is included.

According to the above configuration, angular-velocity offset values may be corrected in real time, and therefore a portable power-saving pedestrian dead-reckoning apparatus may be implemented.

An offset correction apparatus according to any one of the above Aspects of the present disclosure may be implemented by a computer. In this case, the present disclosure includes an offset correction program for an offset correction apparatus, which causes the computer to operate as components (software elements) included in the above offset correction apparatus to thereby cause the above offset correction apparatus to be implemented on the computer, and a computer-readable recording medium having the offset correction program recorded thereon.

The present disclosure is not limited to the embodiments described above and may be changed in various ways without departing from the scope and claims thereof, and embodiments obtained by appropriately combining technical means disclosed in each of different embodiments are included in the technical scope of the present disclosure. Furthermore, new technical features may be formed by combining technical means disclosed in each of the embodiments.

The present disclosure contains subject matter related to that disclosed in Japanese Priority Patent Application JP 2017-203653 filed in the Japan Patent Office on Oct. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A moving motion detection apparatus comprising:
a gyro sensor;
an acceleration sensor;
a geomagnetic sensor;
a memory storing instructions; and
a micro controller that executes the instructions stored in the memory to:
determine, by using an output value of the acceleration sensor and an output value of the geomagnetic sensor, whether the gyro sensor is stationary;
calculate an offset value of the gyro sensor by using an output value of the gyro sensor; and
determine, as a new offset value of the gyro sensor, an offset value calculated by using an output value of the gyro sensor determined to be stationary, wherein
an orientation is determined based on an angular velocity value that is corrected with the new offset value, and
a moving motion is detected by the orientation and the angular velocity value.

2. The moving motion detection apparatus according to claim 1, wherein, as the offset value, a value obtained by dividing, by a fixed time period, a difference between a variation in Euler angles of the gyro sensor over the fixed time period and a value obtained by integrating an output value of the gyro sensor for the fixed time period is calculated.

3. The moving motion detection apparatus according to claim 2, wherein the offset-value is calculated with Euler angles of the gyro sensor by using an output value of the acceleration sensor.

4. The moving motion detection apparatus according to claim 1, wherein the offset-value is calculated with a Kalman filter, a state equation from the angular velocity value output from the gyro sensor is generated, an observation equation by using the state equation and Euler angles of the gyro sensor is generated, and the offset value by using the observation equation is calculated.

5. A pedestrian dead-reckoning apparatus comprising:
a gyro sensor;
an acceleration sensor;
a geomagnetic sensor;
a memory storing instructions; and
a micro controller that executes the instructions stored in the memory to:
determine, by using an output value of the acceleration sensor and an output value of the geomagnetic sensor, whether the gyro sensor is stationary;
calculate an offset value of the gyro sensor by using an output value of the gyro sensor; and
define, as a new offset value of the gyro sensor, an offset value calculated by using an output value of the gyro sensor determined to be stationary, wherein
an orientation is determined based on an angular velocity value that is corrected with the new offset value,
a walking motion is detected by the orientation and the angular velocity value, and
a length of a step is estimated from the orientation and an acceleration value output from the acceleration sensor.

6. A non-transitory computer-readable recording medium storing moving motion detection program, the program causing the computer to execute functions comprising:
determining, by using an output value of an acceleration sensor and an output value of a geomagnetic sensor, whether the gyro sensor is stationary;
calculating an offset value of the gyro sensor by using an output value of the gyro sensor; and
determining, as a new offset value of the gyro sensor, an offset value calculated by using an output value of the gyro sensor determined to be stationary, wherein
an orientation is determined based on an angular velocity value that is corrected with the new offset value, and
a moving motion is detected by the orientation and the angular velocity value.

* * * * *